March 8, 1966
F. L. ZICKEFOOSE
3,238,708
AQUATIC WEED CUTTER
Filed Aug. 10, 1964
3 Sheets-Sheet 2
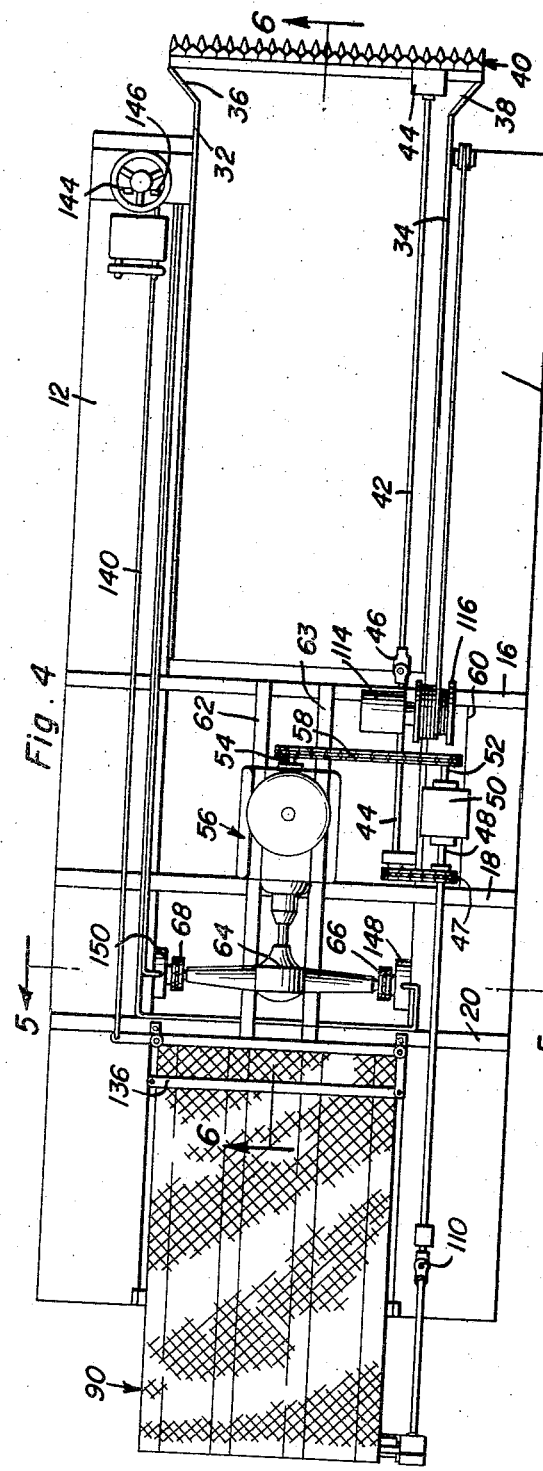
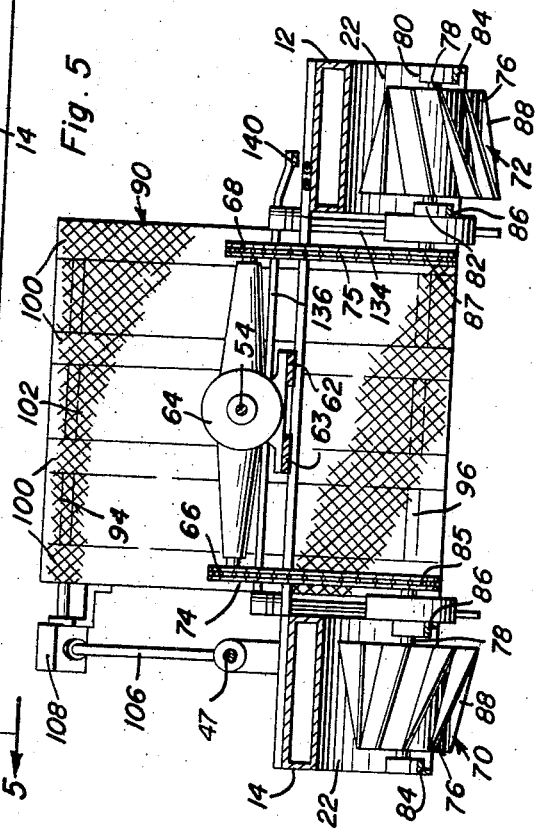
Franklin L. Zickefoose
INVENTOR.
BY *[signatures]*
Attorneys March 8, 1966
F. L. ZICKEFOOSE
3,238,708
AQUATIC WEED CUTTER
Filed Aug. 10, 1964
3 Sheets-Sheet 3
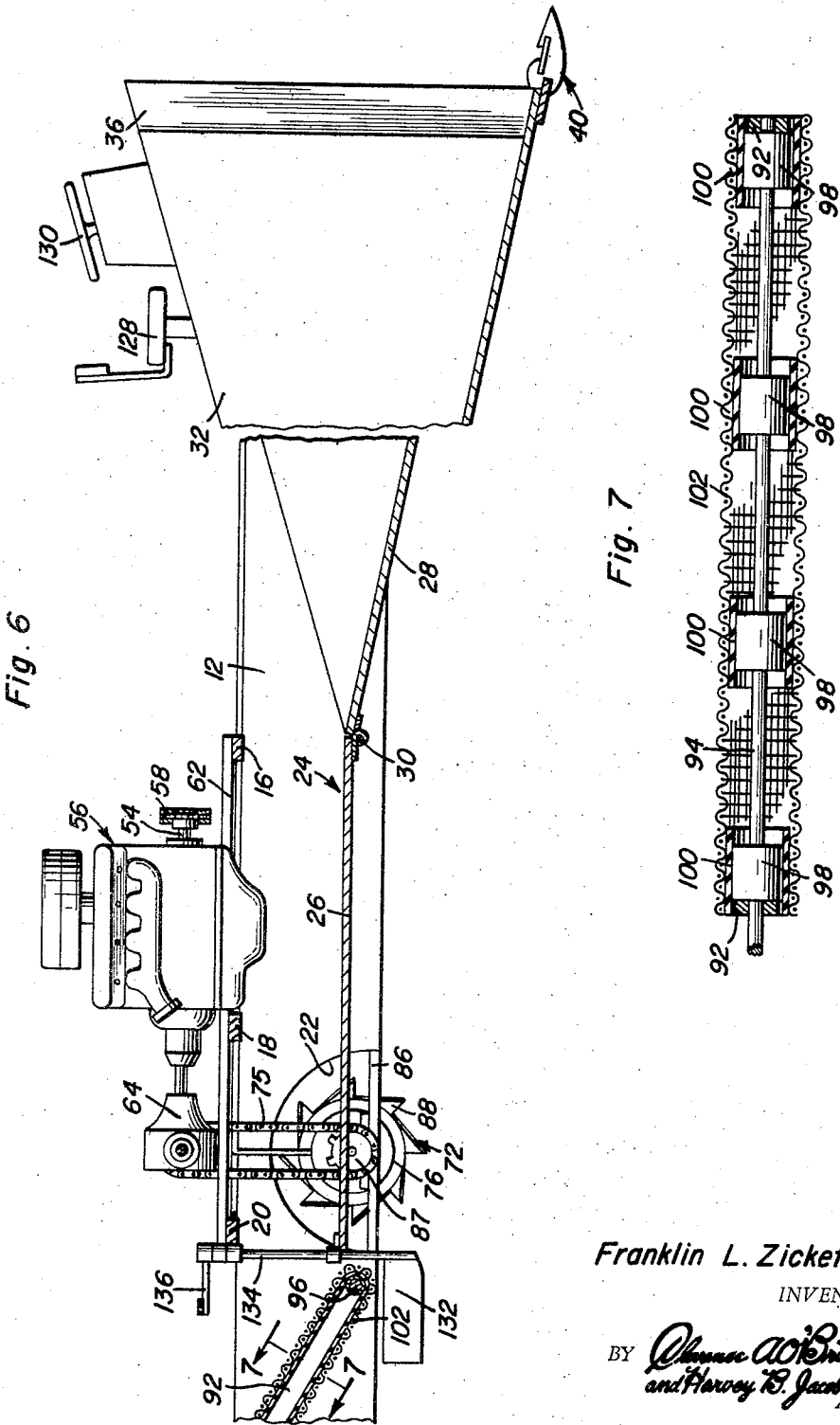
Franklin L. Zickefoose
INVENTOR.
BY
Attorneys

United States Patent Office 3,238,708
Patented Mar. 8, 1966

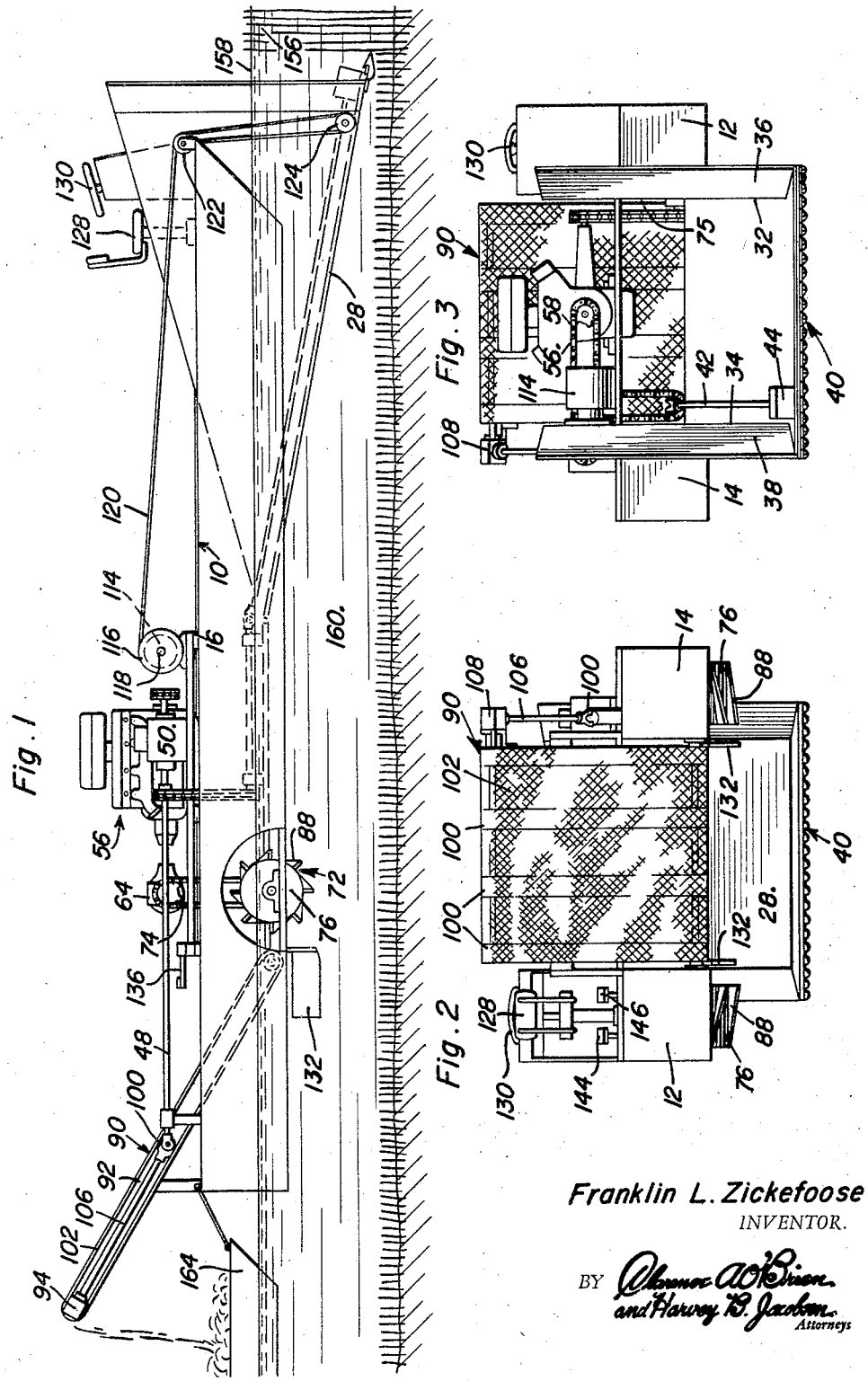

3,238,708
AQUATIC WEED CUTTER
Franklin L. Zickefoose, R.F.D. 1, Conneaut Lake, Pa.
Filed Aug. 10, 1964, Ser. No. 388,555
13 Claims. (Cl. 56—9)

This invention relates to a novel and useful aquatic weed cutter and more specifically to an apparatus designed primarily to economically cut and harvest underwater marine plant life such as seaweed. The aquatic weed cutter of the instant invention includes a pair of elongated hull members having transverse members disposed therebetween rigidly securing the hull members in spaced generally parallel relation. Scoop means is disposed between the forward ends of the hull members and includes a forwardly and downwardly inclined forward portion which is pivotally secured from the remainder of the scoop means for rotation about a horizontal axis extending between the hull members in a manner such that the forward end of the forwardly and downwardly included portion of the scoop means is swingable between raised and lowered inoperative and operative positions. The forward end of the forwardly and downwardly inclined forward portion of the scoop means includes sickle cutter bar means for cutting seaweed far below the surface of the body of water on which the weed cuter is supported. The rear end of the scoop means is generally horizontally disposed and has communication with the exterior of the opposite sides of the weed cutter by means of openings formed through the hull members in horizontal alignment with the scoop means. In addition, rearwardly and upwardly inclined conveyor means has its lower end portion registered with the rear end of the scoop means and may be utilized to elevate the cut seaweed rerawardly of the aquatic weed cutter for reception in a barge or the like towed behind the weed cutter.

As the aquatic weed cutter of the instant invention moves forwardly over a body of water with the forwardly and downwardly inclined forward portion of the scoop means lowered to the operative position, the cutter bar on the scoop means is adapted to cut seaweed below the surface of the body of water on which the aquatic weed cutter is supported and the forward movement of the weed cutter through the water will force some of the water rearwardly and upwardly along the scoop means so as to convey the cut seaweed rearwardly toward the rearwardly and upwardly inclined conveyor means. The water conveyed into the scoop means is discharged laterally outwardly of the openings formed through the hull members and the remaining seaweed is engaged by the conveyor means and conveyed upwardly and rearwardly of the aquatic weed cutter.

The main object of this invention is to provide an aquatic weed cutter including means for economically and efficiently cutting and removing seaweed from a body of water.

Another object of this invention is to provide a novel means for propelling the aquatic weed cutter as well as assisting the removal of water from the rear end of the scoop means by pumping action of the water laterally outwardly of and through the elongated hull members of the weed cutter.

Yet another object of this invention is to provide an aquatic weed cutter including propulsion means disposed on opposite sides thereof which are selectively simultaneously and individually operable to drive the aquatic weed cutter.

Another object of this invention, in accordance with the immediately preceding object, is to provide twin rudder means on opposite sides of the aquatic weed cutter operable in conjunction with the propulsion means therefor whereby the aquatic weed cutter will be highly maneuverable.

A still further object of this invention is to provide a means whereby the forward terminal end portion of the forwardly and downwardly inclined forward end portion of the scoop means may be adjustably vertically positioned as desired.

An ancillary object of this invention is to provide an aquatic weed cutter in accordance with the preceding objects including conveyor means for conveying the cut seaweed whose speed of operation may be varied simultaneously with the speed of operation of the cutter bar means carried by the forward terminal end of the forwardly inclined portion of the scoop means of the aquatic weed cutter.

A final object of this invention to be specifically enumerated herein is to provide an aquatic weed cutter in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the aquatic weed cutter of the instant invention;

FIGURE 2 is a rear elevational view of the aquatic weed cutter as seen from the left side of FIGURE 1;

FIGURE 3 is a front elevational view of the aquatic weed cutter as seen from the right side of FIGURE 1;

FIGURE 4 is a top plan view of the aquatic weed cutter;

FIGURE 5 is a vertical transverse section view taken substantially upon the plane indicated by the section line 5—5 of FIGURE 4;

FIGURE 6 is an enlarged fragmentary vertical longitudinal sectional view taken substantially upon the plane indicated by the section line 6—6 of FIGURE 4; and FIGURE 7 is an enlarged fragmentary transverse sectional view taken substantially upon the plane indicated by the section line 7—7 of FIGURE 6.

Referring now more specificaly to the drawings the numeral 10 generally designates the aquatic weed cutter of the instant invention. The aquatic weed cutter 10 includes a pair of elongated hull members 12 and 14 interconnected by means of transverse brace members 16, 18 and 20. The hull members 12 and 14 are hollow and therefore buoyant and include a pair of downwardly opening and transversely extending recesses 22 disposed in the aft portions thereof.

As can best be seen from FIGURES 1 and 6 of the drawings a scoop assembly generally referred to by the reference numeral 24 is provided and includes a rear substantially horizontally disposed portion 26 and an articulated forward end portion 28 which has its rear end pivotally supported from the forward end of the rear section 26 by means of a hinge assembly 30. The front section 28 includes a pair of opposite upstanding side walls 32 and 34 which include laterally outwardly directed forward end portions 36 and 38. A sickle bar cutter bar assembly generally referred to by the refence numeral 40 is supported at the forward end of the forward section 28 and is driven by means of a drive shaft 42 through a gear box 44. The rear end of the drive shaft 42 is coupled to the forward end of the lay shaft 44 by means of a universal joint 46 in vertical alignment with the hinge assembly 30 and the rear end of the lay shaft 44 is driven by means of a chain 47 drivingly coupling an output shaft 48 of a transmission 50 to the lay shaft 44. The transmission 50 includes an input shaft 52 to which the output shaft 54 of an internal combustion engine generally referred to by the reference numeral 56 is drivingly connected by means of a chain 58.

The transmission 50 is supported from the hull member 14 by means of a suitable longitudinal brace member 60 secured between the transverse brace members 16 and 18. In addition, the internal combustion engine 56 is supported from a pair of longitudinal brace members 62 and 63 secured over the transverse brace members 16, 18 and 20.

The internal combustion engine 56 is also drivingly coupled to a differential assembly 64 by means of the end of the output shaft 54 remote from the chain 58 and the differential assembly 64 drives a pair of sprockets 66 and 68 which are drivingly coupled to a pair of paddle wheel assemblies 70 and 72 by means of link chains 74 and 75, respectively. The paddle wheel assembles 70 and 72 are each disposed in the corresponding recess 22 and include paddle wheel members 76 which are mounted on shafts 78 journaled by means of journal blocks 80 and 82 supported from a pair of corresponding longitudinal brace members 84 and 86, respectively, extending across the lower portion of the corresponding recess 22. The link chains 74 and 75 are entrained over sprocket wheels 85 and 87 which are mounted on the inboard ends of the corresponding shaft 78 for rotation therewith.

Each of the paddle wheels 76 includes a plurality of blades 88 spaced circumferentially thereabout and which are triangular in shape and tapered toward their outboard ends and inclined relative to the axes of rotation of the paddle wheels 76 so as to not only function as propulsion means for the weed cutter but also as pump means for pumping water from the rear end of the rear section 26 of the scoop means 24. Upon rotation of the paddle wheels 76 in the direction to propel the weed cutter 10 in a forward direction, water disposed on the rear portion or section 26 of the scoop means 24 will be pumped outwardly of the recesses 22.

A rearwardly and upwardly inclined conveyor assembly generally referred to by the reference numeral 90 is mounted on the aft portion of the aquatic weed cutter between the hull members 12 and 14 by means of opposite side members 92 of the conveyor assembly 90 between whose upper and lower ends a pair of support shafts 94 and 96 are journaled. A plurality of rollers 98 are mounted at axially spaced position on each of the shafts 94 and 96 and the corresponding rollers 98 have endless belts 100 entrained thereabout. An endless belt 102 constructed of wire mesh is entrained over the belts 100 and the shaft 94 is driven by means of a drive shaft 106 which is drivingly coupled thereto by means of a gear transmission 108. The end of the drive shaft 106 remote from the gear box or transmission 108 is operatively connected to the rear end of the output shaft 48 of the transmission 50 by means of a universal joint 110 and accordingly it may be seen that the speed of the conveyor assembly 90 and the cutter bar 40 may be simultaneously varied relative to the speed of the engine 56 by means of the transmission 50.

The transverse brace member 16 also supports an electric winch 114 having a drum 116 mounted on its power output shaft 118. One end of a flexible tension member 120 is wound about the drum 116 and the other end of the tension member 120 is passed over a pulley 122 supported from the forward end of the hull member 14 and about a pulley 124 secured to the forward terminal end portion of the forwardly and downwardly inclined portion 28 of the scoop means 24. Thereafter, the free end of the tension member 120 is passed upwardly and is secured to the forward end of the hull member 14. Accordingly, it may be seen that the reversible electric winch 114 may be utilized to raise and lower the forward section or portion 28 of the scoop or scoop means 24.

The forward end of the hull member 12 is provided with an operator's seat 128 and a steering wheel 130 which is operatively connected to a pair of rudders 132 supported from the pair of rudder posts 134 journaled for rotation about upstanding axes from the hull members 12 and 14 in any convenient manner. The rudder posts 134 are interconnected by means of a parallelogram linkage assembly 136 and an actuating rod 140 is operatively connected between the steering wheel 130 and the parallelogram linkage assembly 136. In addition, the forward end portion of the hull member 12 includes a pair of brake pedals 144 and 146 which are in turn operatively connected to suitable brake assemblies 148 and 150 which are in turn operatively associated with the sprocket wheels 66 and 68. Although the brake assemblies 148 and 150 may not be simultaneously actuated, in view of the provision of the differential assembly 64, either of the brake assemblies 148 and 150 may be individually actuated to prevent rotation of the corresponding paddle wheel 76.

In operation, the internal combustion engine 56 may be utilized to selectively or simultaneously drive the paddle wheels 76 and to also drive the conveyor assembly 90 and the cutter bar assembly 40. After the articulated section 28 of the scoop means 24 has been positioned as desired by means of the electric winch 114, the aquatic weed cutter 10 may be utilized to cut the seaweed 156 below the surface 158 of the body of water 160 supporting the aquatic weed cutter 10. The braking and rudder controls may be utilized to steer the aquatic weed cutter 10 and as the latter moves forwardly over the water 160, water and the cut seaweed 156 will be forced upwardly and rearwardly along the articulated portion 28 of the scoop means 24 and onto the rear stationary section or portion 26 of the scoop means 24. Thereafter, the water disposed on the scoop means 24 will be pumped laterally outwardly through the recesses 22 formed in the hull members 12 and 14 by the paddle wheels 76. The remaining cut seaweed 156 may then be engaged by the rearwardly and upwardly inclined conveyor assembly 90 and conveyed upwardly to the upper end of the conveyor assembly 90 whereupon it will be discharged into a barge 164 towed by the aquatic weed cutter 10.

If it is desired, suitable means (not shown) in the form of wire mesh or the like may be utilized to prevent the cut seaweed 156 from also being pumped through the recesses 22 and it is to be noted that suitable operating controls for the internal combustion engine 56, the electric winch 114 and the shift mechanism for the transmission 50 will also be provided adjacent the operator seat 128.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An aquatic weed cutter including a pair of elongated hull members, transverse brace means rigidly securing said hull members together in laterally spaced generally parallel relation, scoop means including a forwardly and downwardly inclined forward portion disposed between and supported from the forward end portion of said hull members, said hull members, rearwardly of the said forward portion, including means defining openings extending transversely through said hull members below the upper portions thereof including portions disposed above the water line of said weed cutter, and communicated with said scoop means at their inner ends.

2. The combination of claim 1 wherein said forward portion of said scoop includes means adapted to cut underwater marine vegetation.

3. The combination of claim 1 including water pump means operable to pump water from the rear portion of said scoop means laterally outwardly of said openings.

4. The combination of claim 1 wherein the forward end portion of said scoop means is pivotally supported between said hull members for rotation about a horizontal axis extending transversely of said hull members for vertical swinging movement of the forward terminal end of said forward end portion between raised and lowered positions.

5. An aquatic weed cutter including a pair of elongated hull members, transverse brace means rigidly securing said hull members together in laterally spaced generally parallel relation, scoop means including a forwardly and downwardly inclined forward portion disposed between and supported from the forward end portion of said hull members, said hull members, rearwardly of said forward portion, including means defining transversely extending openings including portions disposed above the water line of said weed cutter and communicated with said scoop at their inner ends, water pump means operable to pump water from the rear portion of said scoop means laterally outwardly of said openings, said openings comprising downwardly opening transverse passages whose upper portions are disposed above said water line, said pump means comprising paddle wheels disposed in said passages, journaled for rotation about horizontal axes extending transversely of said hull members and including lower portions projecting below the adjacent portions of the undersurfaces of said hull members.

6. The combination of claim 5 wherein said paddle wheels include paddle blades orientated relative to the axis of rotation of said paddle wheels so as to effect a rearward and laterally outward thrust on the water acted upon thereby upon rotation of said paddle wheels.

7. An aquatic weed cutter including a pair of elongated hull members, transverse brace means rigidly securing said hull members together in laterally spaced generally parallel relation, scoop means including a forwardly and downwardly inclined forward portion disposed between and supported from the forward end portion of said hull members, said hull members, rearwardly of said forward portion, including means defining transversely extending openings including portions disposed above the water line of said weed cutter and communicated with said scoop at their inner ends, water pump means operable to pump water from the rear portion of said scoop means laterally outwardly of said openings, said openings comprising downwardly opening transverse passages whose upper portions are disposed above said water line, said pump means comprising paddle wheels disposed in said passages, journaled for rotation about horizontal axes extending transversely of said hull members and including lower portions projecting below the adjacent portions of the undersurfaces of said hull members, and power drive means supported from said hull members and operatively connected to said paddle wheels for selectively simultaneously and individually driving said paddle wheels.

8. The combination of claim 7 including brake means supported from said hull members and operatively connected to said paddle wheels for selectively simultaneously and individually braking said paddle wheels.

9. The combination of claim 1 wherein the forward end portion of said scoop means is pivotally supported between said hull members for rotation about a horizontal axis extending transversely of said hull members for vertical swinging movement of the forward terminal end of said forward end portion between raised and lowered positions, and means operatively connected between said forward end portion of said scoop and said hull members for raising and lowering the forward terminal ends of said forward end portion of said scoop.

10. An aquatic weed cutter including a pair of elongated hull members, transverse brace means rigidly securing said hull members together in laterally spaced generally parallel relation, scoop means including a forwardly and downwardly inclined forward portion disposed between and supported from the forward end portion of said hull members, said hull members, rearwardly of said forward portion, including means defining transversely extending openings including portions disposed above the water line of said weed cutter and communicated wth said scoop at their inner ends, and rearwardly and upwardly inclined conveyor means supported from and between said hull member and including a forward lower end portion disposed rearwardly of said openings.

11. An aquatic weed harvester including a pair of elongated hull members, transverse brace means rigidly securing said hull members together in laterally spaced generally parallel relation, scoop means including a forwardly and downwardly inclined forward portion disposed between and supported from the forward end portion of said hull members and adapted to receive cut underwater marine vegetation, said hull members, rearwardly of said forward portion including means defining openings extending transversely through said hull members below the upper portions thereof, including portions disposed above the water line of said harvester, and communicated with said scoop means at their forward ends.

12. The combination of claim 11 including rearwardly and upwardly inclined conveyor means supported from and between said hull members and including a forward lower end portion disposed rearwardly of said openings.

13. The combination of claim 11 including water pump means operable to pump water from the rear portion of said scoop means laterally outwardly of said openings, said openings comprising downwardly opening transverse passages whose upper portions are disposed above said water line, said pump means comprising paddle wheels disposed in said passages, journaled for rotation about horizontal axes extending transversely of said hull members and including lower portions projecting below the adjacent portions of the undersurface of said hull members.

References Cited by the Examiner

UNITED STATES PATENTS

| | | | |
|---|---|---|---|
| 1,138,541 | 4/1915 | Conekin | 43—6.5 |
| 1,344,626 | 6/1920 | Ellis | 56—9 |
| 1,606,668 | 11/1926 | Rubach | 43—6.5 |
| 1,839,380 | 1/1932 | Druppel | 56—8 |
| 2,116,883 | 5/1938 | Doxsee | 37—55 |
| 2,223,641 | 12/1940 | Sanger | 56—8 |
| 2,325,134 | 7/1943 | Hopkins et al. | 37—71 |
| 2,655,779 | 10/1953 | Sanders | 56—9 |

ABRAHAM G. STONE, *Primary Examiner.*

RUSSELL R. KINSEY, *Examiner.*